(12) United States Patent
Cohen et al.

(10) Patent No.: US 9,026,511 B1
(45) Date of Patent: May 5, 2015

(54) CALL CONNECTION VIA DOCUMENT BROWSING

(75) Inventors: Michael H. Cohen, Portola Valley, CA (US); Maryam Kamvar, San Francisco, CA (US); Shumeet Baluja, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 1277 days.

(21) Appl. No.: 11/169,151

(22) Filed: Jun. 29, 2005

(51) Int. Cl.
*G06F 7/00* (2006.01)
*G06F 17/30* (2006.01)

(52) U.S. Cl.
CPC .............................. *G06F 17/30864* (2013.01)

(58) Field of Classification Search
USPC ............ 707/999.102, 705, 755, 769; 705/1.1; 709/217
See application file for complete search history.

(56) References Cited

U.S. PATENT DOCUMENTS

| | | | |
|---|---|---|---|
| 6,173,045 B1 * | 1/2001 | Smith | 379/93.23 |
| 6,285,999 B1 | 9/2001 | Page | 707/5 |
| 6,606,611 B1 * | 8/2003 | Khan | 706/10 |
| 6,832,221 B2 * | 12/2004 | Takahashi | 707/6 |
| 6,845,483 B1 * | 1/2005 | Carroll | 715/513 |
| 6,993,013 B1 * | 1/2006 | Boyd | 370/352 |
| 7,251,313 B1 * | 7/2007 | Miller et al. | 379/88.01 |
| 2002/0078035 A1 | 6/2002 | Frank et al. | 707/3 |
| 2002/0156779 A1 * | 10/2002 | Elliott et al. | 707/6 |
| 2003/0050926 A1 * | 3/2003 | Agnihotri et al. | 707/5 |
| 2003/0078987 A1 * | 4/2003 | Serebrennikov | 709/217 |
| 2003/0115189 A1 | 6/2003 | Srinivasa et al. | 707/3 |
| 2003/0130864 A1 * | 7/2003 | Ho et al. | 705/1 |
| 2004/0181815 A1 * | 9/2004 | Hull et al. | 725/134 |
| 2004/0236730 A1 | 11/2004 | Frank | 707/3 |
| 2005/0097189 A1 * | 5/2005 | Kashi | 709/217 |

OTHER PUBLICATIONS

Co-pending U.S. Appl. No. 11/024,765, M. Riley, "Local Item Extraction," Dec. 20, 2004, 49 pp.

* cited by examiner

*Primary Examiner* — Hosain Alam
*Assistant Examiner* — Jieying Tang
(74) *Attorney, Agent, or Firm* — Harrity & Harrity, LLP

(57) ABSTRACT

A system receives an indication of a document selected from a corpus of documents and determines a telephone number associated with the selected document. The system facilitates a voice call to the telephone number.

16 Claims, 14 Drawing Sheets

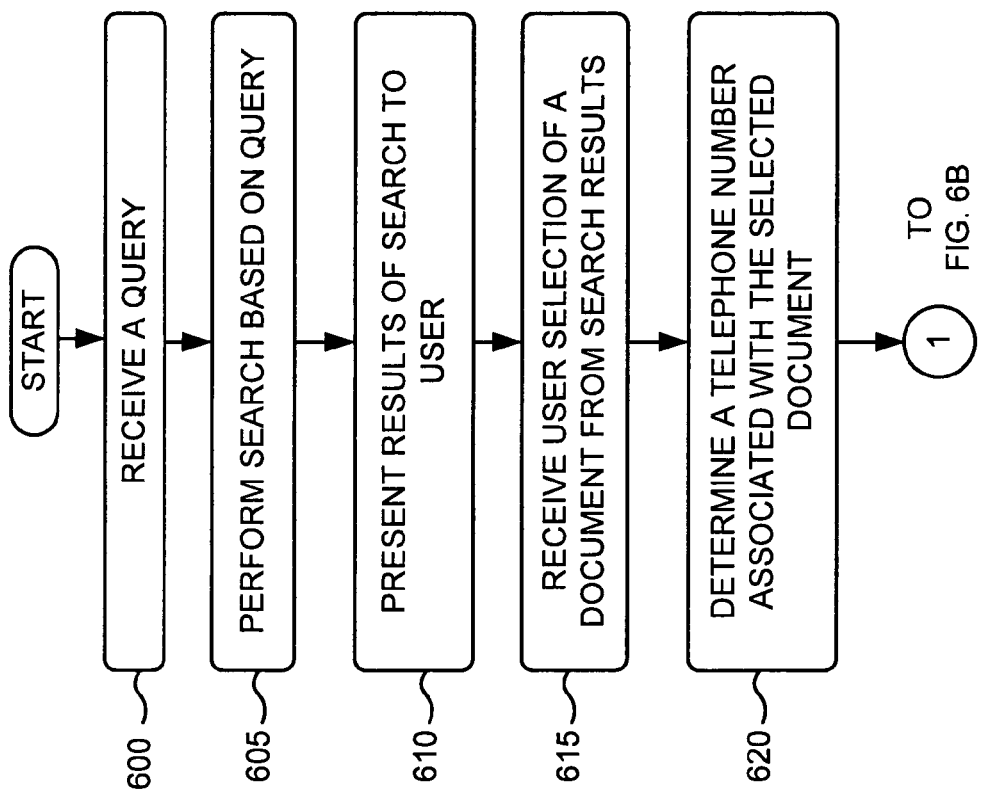

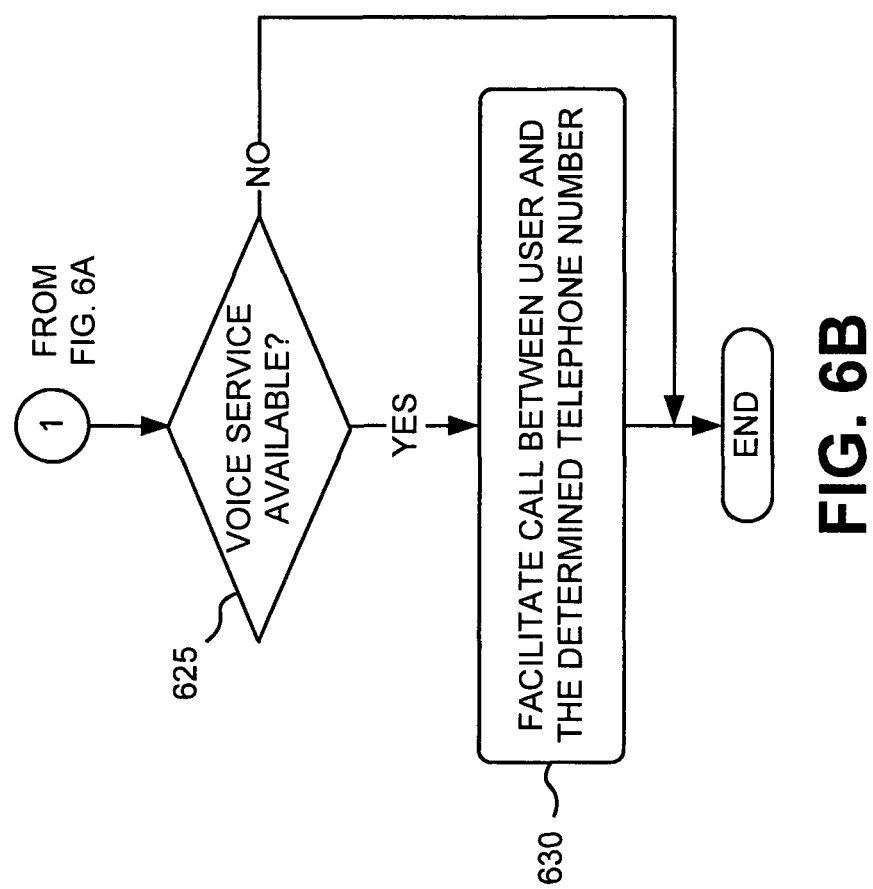

CALL CONNECTION VIA DOCUMENT BROWSING

BACKGROUND

1. Field of the Invention

Implementations described herein relate generally to information retrieval and, more particularly, to facilitating telephone calls via browsing of documents.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are "hits" and are returned to the user as links.

SUMMARY

According to one aspect, a method may include retrieving code corresponding to a document and generating the document using the code, where a first portion of the code produces visible text in the document and a second portion of the code does not produce visible text in the document. The method may further include extracting a tag from the second portion of the code, wherein the tag identifies a telephone number associated with the document.

According to another aspect, a computer-implemented method may include receiving a search query and searching a corpus of documents based on the received search query to identify a set of search result documents. The method may further include receiving a selection of a document from the set of search result documents and determining a telephone number associated with the selected document. The method may also include initiating a call to the telephone number.

According to a further aspect, a computer-implemented method may include retrieving a document and parsing a telephone number from text contained in the document. The method may further include initiating a voice call to the telephone number.

According to another aspect, a computer-implemented method may include retrieving a document and parsing, from text contained in the document, a name of an entity associated with the document. The method may further include determining a telephone number associated with the name of the entity and initiating a call to the telephone number.

According to an additional aspect, a computer-implemented method may include receiving an indication of a document selected from a corpus of documents and determining a telephone number associated with the selected document. The method may further include facilitating a voice call to the telephone number.

According to yet another aspect, a computer-implemented method may include analyzing a first document hosted on a site to ascertain whether a telephone number is associated with the first document and analyzing, if the first document does not have a telephone number associated with it, other documents hosted on the site to identify one or more telephone numbers associated with the other documents. The method may further include selectively associating the one or more telephone numbers with the first document.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIGS. 6A-6B are flowcharts of an exemplary process for facilitating a call via document searching according to an implementation consistent with principles of the invention;

DETAILED DESCRIPTION

The following detailed description of the invention refers to the accompanying drawings. The same reference numbers in different drawings may identify the same or similar elements. Also, the following detailed description does not limit the invention.

Searching the web may provide access to documents, such as web pages, that are relevant to a user specified search query. Conventionally, though, searching of the web does not permit a user to also easily obtain telephone number information associated with web pages returned as search results. Consistent with one aspect of the invention, a telephone call may be initiated based on user selection of a result from a set of results returned based on an executed search. In another aspect of the invention, a telephone call may be initiated based on user retrieval of a document, such as a web document, during document browsing.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, a segment of video data, a segment of audio data, etc. In the context of the Internet, a common document is a web page. Web pages often include textual information and may include embedded information (such as meta information, images, hyperlinks, etc.) and/or embedded instructions (such as Java-script, etc.). A "link," as the term is used herein, is to be broadly interpreted to include any reference to/from a document from/to another document or another part of the same document.

Overview

Figure 1:
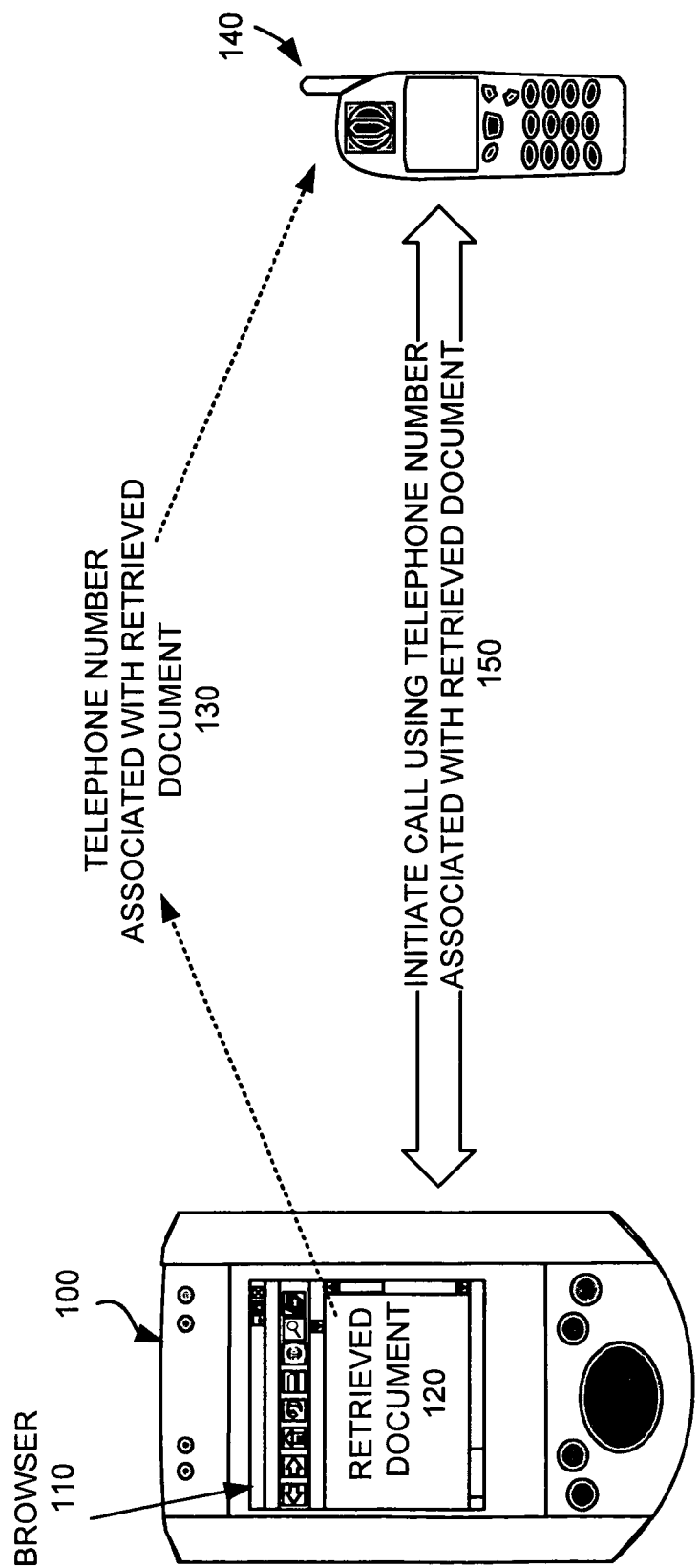
FIG. 1 is an exemplary diagram of an overview of an implementation of the invention in which a telephone call is initiated based on retrieval of a document at a client browser.

FIG. 1 illustrates an exemplary overview of an implementation of the invention in which a telephone call is initiated based on, for example, retrieval of a document at a client browser. As shown in FIG. 1, a client entity 100, such as a personal digital assistant (PDA), may execute a browser 110. Client entity 100 may include one or more transducers that permit the conversion of audio signals to and from digital electrical signals. Using browser 110, a user may retrieve a document 120, such as a web page. The user may retrieve document 120 by directly entering the document's Uniform Resource Locator (URL) in browser 110, or by selecting document 120 from a set of search results produced by a search engine in response to the user supplying a search query to the search engine. Based on retrieval of document 120, a telephone number associated with the retrieved document 130 may be determined that corresponds to a destination telephone 140. Destination telephone 140 may include any type of telephony device, including a wireless (e.g., portable) telephone, a land-line telephone, or any other type of telephone. A call 150 between client entity 100 and telephone 140 may then be initiated using the telephone number determined to be associated with the retrieved document 120. The call may include a voice over Internet Protocol (VOIP) call, or a wireless or wireline voice call. In the situation where client entity 100 doesn't have phone capabilities, client entity 100 may provide the determined telephone number such that a call may be initiated using a separate phone device.

Exemplary Network Configuration

Figure 2:
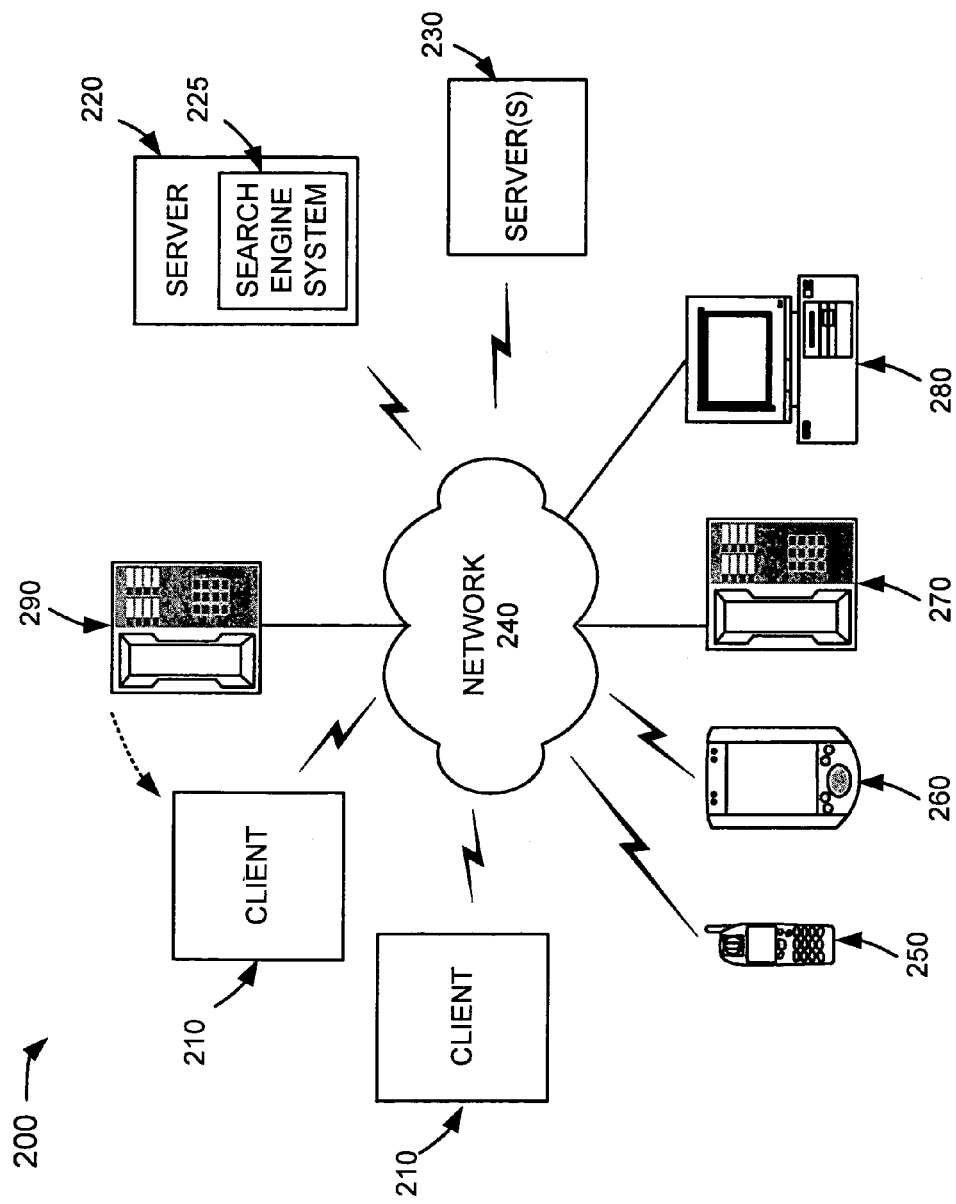
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to one or more servers 220-230 via a network 240. Two clients 210 and two servers 220-230 have been illustrated as connected to network 240 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-230 may include server entities that gather, process, search, and/or maintain documents in a manner consistent with the principles of the invention.

In an implementation consistent with the principles of the invention, server 220 may include a search engine system 225 usable by clients 210. Server 220 may crawl a corpus of documents (e.g., web documents), index the documents, and store information associated with the documents in a repository of documents. Server(s) 230 may store or maintain documents that may be crawled or analyzed by server 220.

While servers 220-230 are shown as separate entities, it may be possible for one of servers 220-230 to perform one or more of the functions of the other one of servers 220-230. For example, it may be possible that servers 220 and 230 are implemented as a single server. It may also be possible for a single one of servers 220 and 230 to be implemented as two or more separate (and possibly distributed) devices.

Network 240 may include one or more networks of any type, including a local area network (LAN), a wide area network (WAN), a metropolitan area network (MAN), a telephone network, such as the Public Switched Telephone Network (PSTN) or a Public Land Mobile Network (PLMN), an intranet, the Internet, a memory device, or a combination of networks. The PLMN(s) may further include a packet-switched sub-network, such as, for example, General Packet Radio Service (GPRS), Cellular Digital Packet Data (CDPD), and Mobile IP sub-network. Clients 210 and servers 220-230 may connect to network 240 via wired, wireless, and/or optical connections.

Mobile telephone 250, PDA 260, land-line telephones 270 and 290, and desktop computer 280 may further connect to network 240 via wired, wireless and/or optical connections, as appropriate. Land-line telephone 290 may be associated (e.g., co-located) with a client 210. In response to retrieval of a document at a browser of a client 210, a telephone number that is associated with the retrieved document may be determined. The telephone number may further be associated with one of mobile telephone 250, PDA 260, telephone 270 or desktop computer 280. A call may then be connected between a user at client 210 and one of mobile telephone 250, PDA 260, telephone 270 or desktop computer 280 that is associated with the determined telephone number. In one implementation, the call may include a voice over Internet Protocol (VOIP) connection between client 210 and PDA 260 or desktop computer 280. In other implementations, the call may include a circuit-switched connection between client 210, or an associated telephone 290, and mobile telephone 250 or telephone 270.

Exemplary Client/Server Architecture

Figure 3:
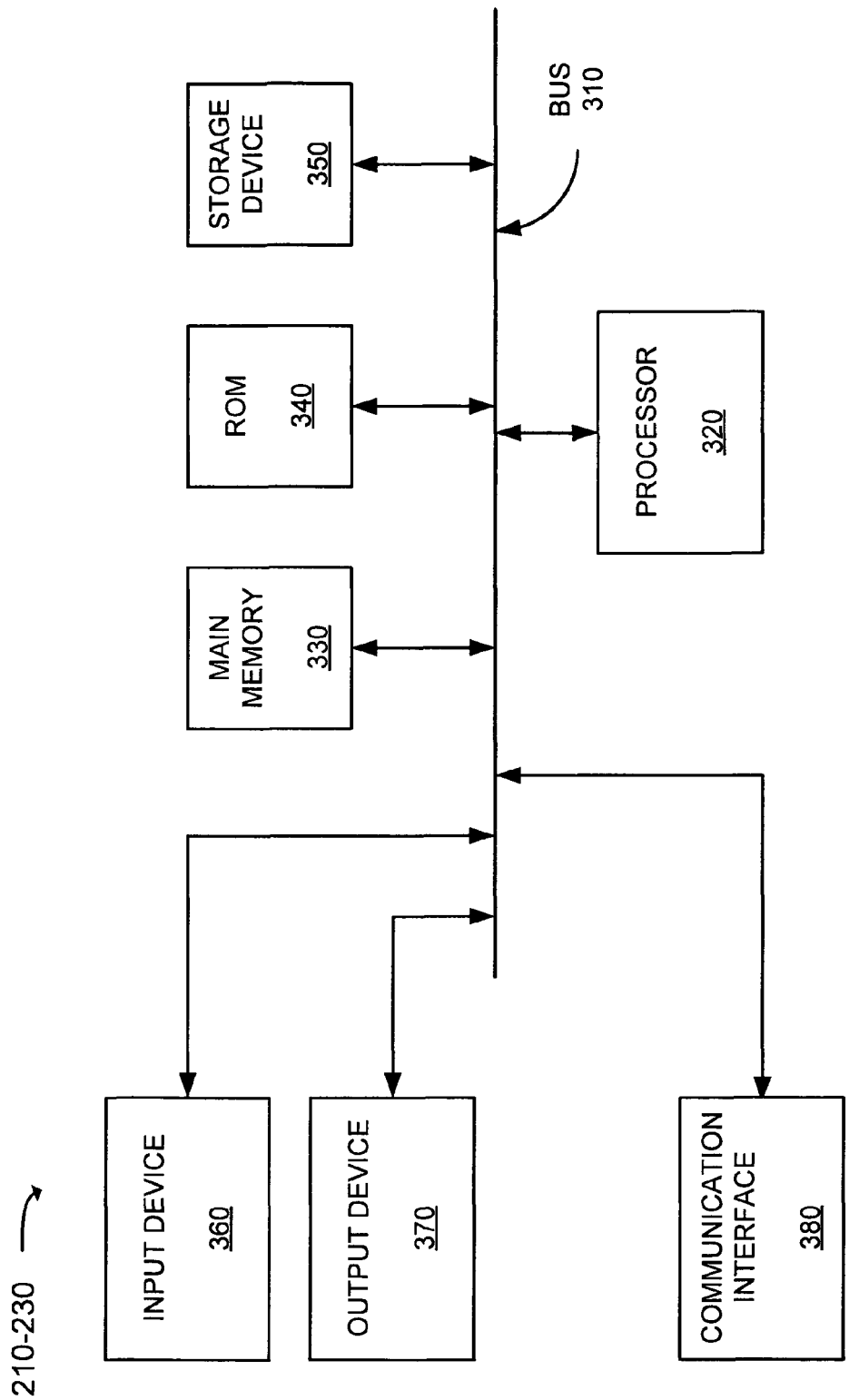
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-230, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that may interpret and execute instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 240.

The client/server entity, consistent with the principles of the invention, may perform certain operations, as will be described in detail below. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 280. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Calling Process Via Document Browsing

Figure 4:
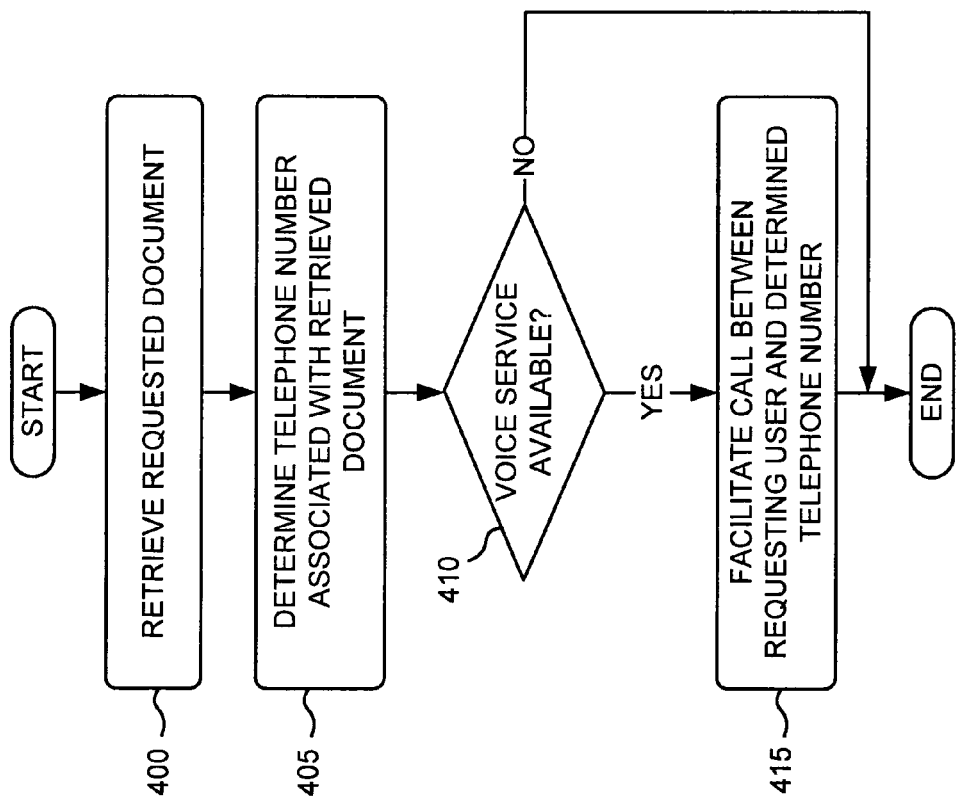
FIG. 4 is a flowchart of an exemplary process for facilitating a call using a telephone number determined when browsing a document according to an implementation consistent with the principles of the invention.

FIG. 4 is a flowchart of an exemplary process for facilitating a call using a telephone number determined when browsing a document, according to an implementation consistent with the principles of the invention. As one skilled in the art will appreciate, the process exemplified by FIG. 4 can be implemented in software and stored on a computer-readable memory, such as main memory 330, ROM 340 or storage device 350 of client 210.

Figure 5:
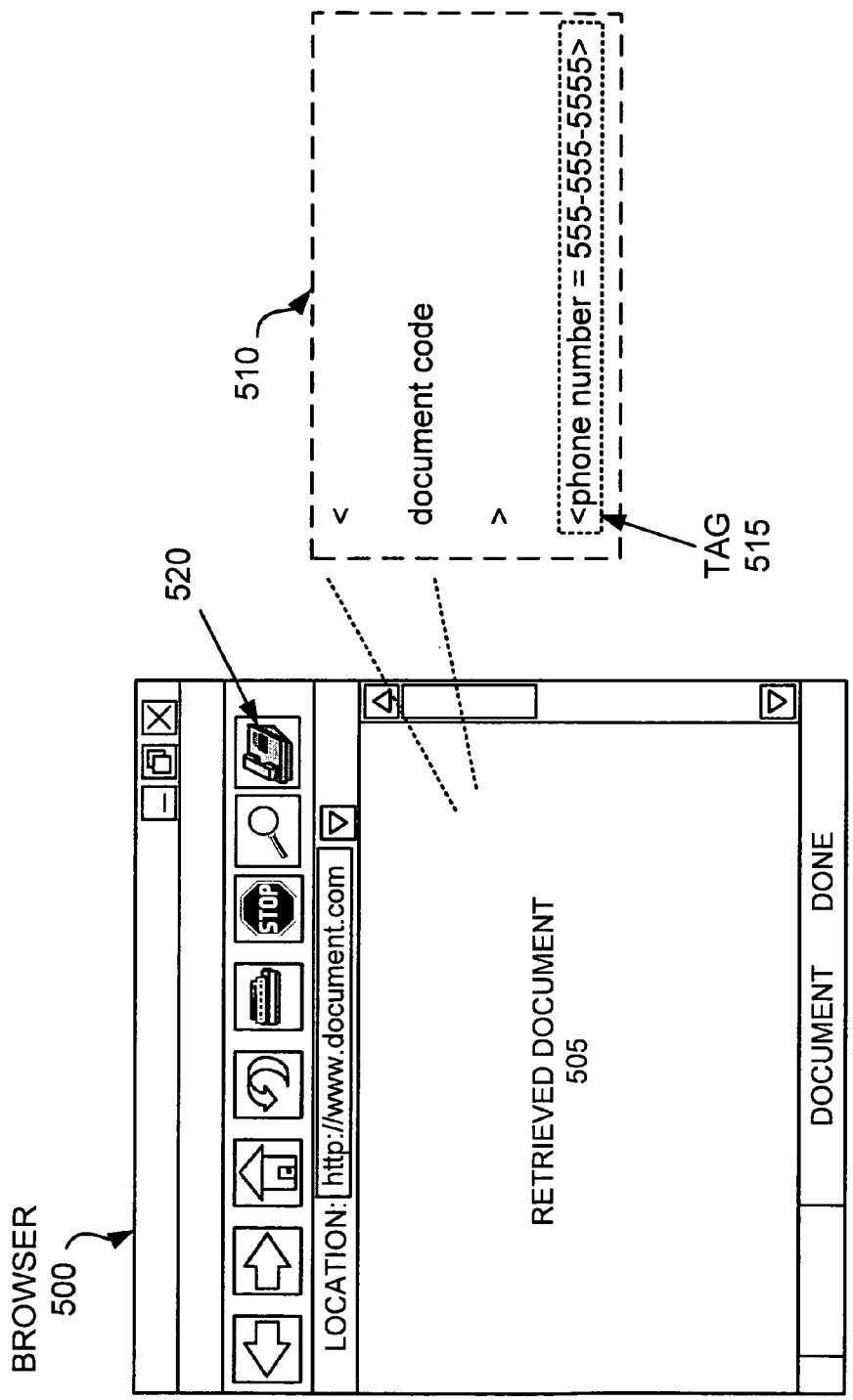
FIG. 5 is an exemplary diagram of a telephone number inserted into code used to generate a document consistent with an aspect of the invention.

The exemplary process may begin with the retrieval of a requested document (block 400). For example, as shown in FIG. 5, a user may enter a document's URL into their web browser 500 to retrieve a document 505 from a server, such as server 230. A telephone number associated with the retrieved document may then be determined (block 405). For example, as shown in FIG. 5, browser 500 may analyze code 510 associated with document 505 to identify a tag 515 within code 510. Code 510 may include, for example, hypertext markup language (HTML) code, and may include code that generates visible textual portions of document 505 (e.g., visible text), and code that does not generate visible textual portions of document 505 (e.g., code that formats document 505, etc.), such as code corresponding to tag 515. Tag 515 may include special designated code within document 505 that specifies a telephone number that is to be associated with document 505. In one implementation, for example, tag 515 may include hypertext markup language (HTML) code, that does not generate visible text in document 505, which specifies a telephone number. The telephone number contained in tag 515, thus, would not be visible to a viewer of document 505, but could be extracted from the document by an analysis of the document code to locate tag 515 within the document code. In other implementations, a document may visibly display a telephone number, along with a visual indication indicating that the telephone number is "callable." Such a visual indication may include, for example, an icon associated with the telephone number, or underlining or coloring of the telephone number in a way that makes it look different from other types of indicators, such as, for example, link indicators (e.g., different than hypertext links).

In some instances, a telephone number may not be determined to be associated with the retrieved document. Some retrieved documents may not have an associated telephone number (i.e., no tag 515 contained in the document code) and, therefore, no voice service may be available with respect to the retrieved document (block 410—NO). If voice service is available with respect to the retrieved document (i.e., a telephone number is determined to be associated with the retrieved document) (block 410—YES), a call may be facilitated between the user who requested the document and the determined telephone number (block 415). For example, if the determined telephone number is associated with desktop computer 280, then a VOIP call may be established between client 210 and a user at desktop computer 280. As another example, if the determined telephone number is associated with mobile telephone 250, and client 210 resides in a mobile telephone, then a call may be established between the mobile telephone in which client 210 resides and mobile telephone 250.

In one implementation, as shown in FIG. 5, a call may be facilitated, after retrieval of the document, when the user "selects" a button 520 upon a toolbar of browser 500. Thus, to establish a call with a telephone number associated with document 505 retrieved via browser 500, the user may select call button 520 upon a toolbar of browser 500 and tag 515 of document 505 may be located and the telephone number may be extracted from tag 515 for call establishment. In another implementation, multiple tags, each identifying a different telephone number, may be contained in document 505. To establish a call with one of the telephone numbers associated with a document retrieved via browser 500, the user may select a telephone number, from a list of telephone numbers displayed, for example, upon a toolbar of browser 500 that correspond to each tag of the multiple tags. A telephone application may receive the determined telephone number and initiate placement of the call using existing call connection techniques.

Exemplary Calling Process Via Document Searching

FIG. 6 is a flowchart of an exemplary process for facilitating a call using a telephone number determined when searching documents according to an implementation consistent with the principles of the invention. As one skilled in the art will appreciate, the process exemplified by FIGS. 6A and 6B can be implemented in software and stored on a computer-readable memory, such as main memory 330, ROM 340 or storage device 350 of server 220.

Figure 7:
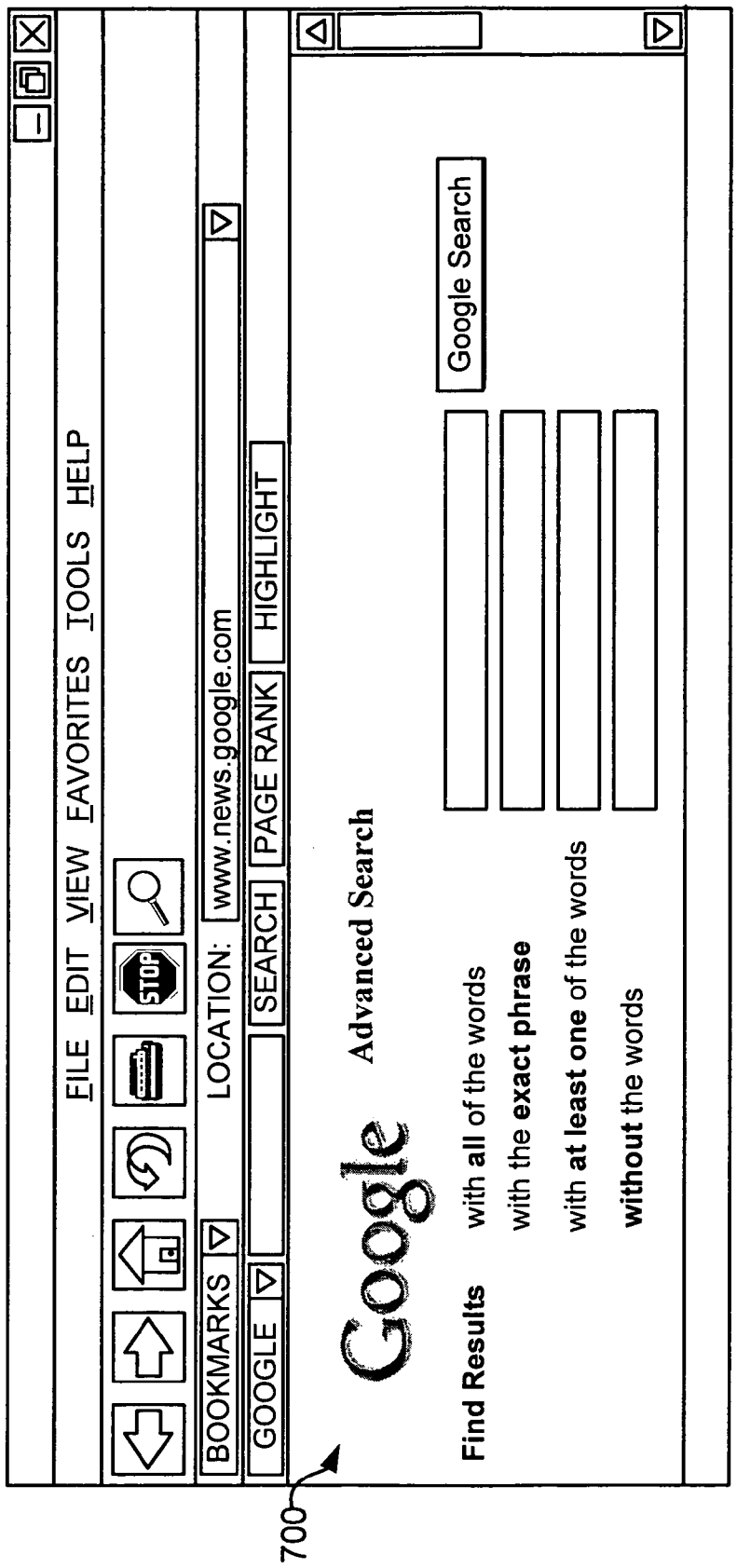
FIG. 7 is an exemplary diagram of a search query entry document consistent with an aspect of the invention.

The exemplary process may begin with the receipt of a search query from, for example, a user at a client 210 (block 600). Search engine system 225 may receive a query from a client 210. For example, as shown in FIG. 7, a user may enter terms of a search query in a search document 700 presented to the user in a browser at client 210. A search may be performed based on the received query (block 605). Existing searching algorithms may be used at search engine system 225 to search a corpus of documents based on the received query. For example, documents in the corpus of documents may be identified that include one or more of the terms of the received query.

The results of the search may be presented to the user (block 610). Prior to presentation of the search results to the user, an information retrieval (IR) score may be generated for each of the documents of the search results. The IR score may be based on the number of occurrences of the search terms in the document. The IR score may be adjusted based on where the search terms occur within the document (e.g., title, content, etc.) or characteristics of the search terms (e.g., font, size, color, etc.). The IR score may also or alternatively be adjusted based on the proximity of the search terms when multiple search terms are present. Yet other techniques for generating or adjusting an IR score for a document are known to those skilled in the art.

In one implementation, total scores for the documents may be generated based on a combination of their IR scores and link-based scores associated with the documents. Several techniques exist for determining the link-based score of a document. One such technique is described in U.S. Pat. No. 6,285,999, entitled "METHOD FOR NODE RANKING IN A LINKED DATABASE," the contents of which are incorporated by reference.

The documents may be ranked (e.g., sorted) based on their scores and then presented as a list of search results. The list of search results may be provided as a HTML document, similar to search results provided by conventional search engines. Alternatively, the search results may be provided according to a format agreed upon by search engine system 225 and client 210 (e.g., Extensible Markup Language (XML)).

Figure 8:
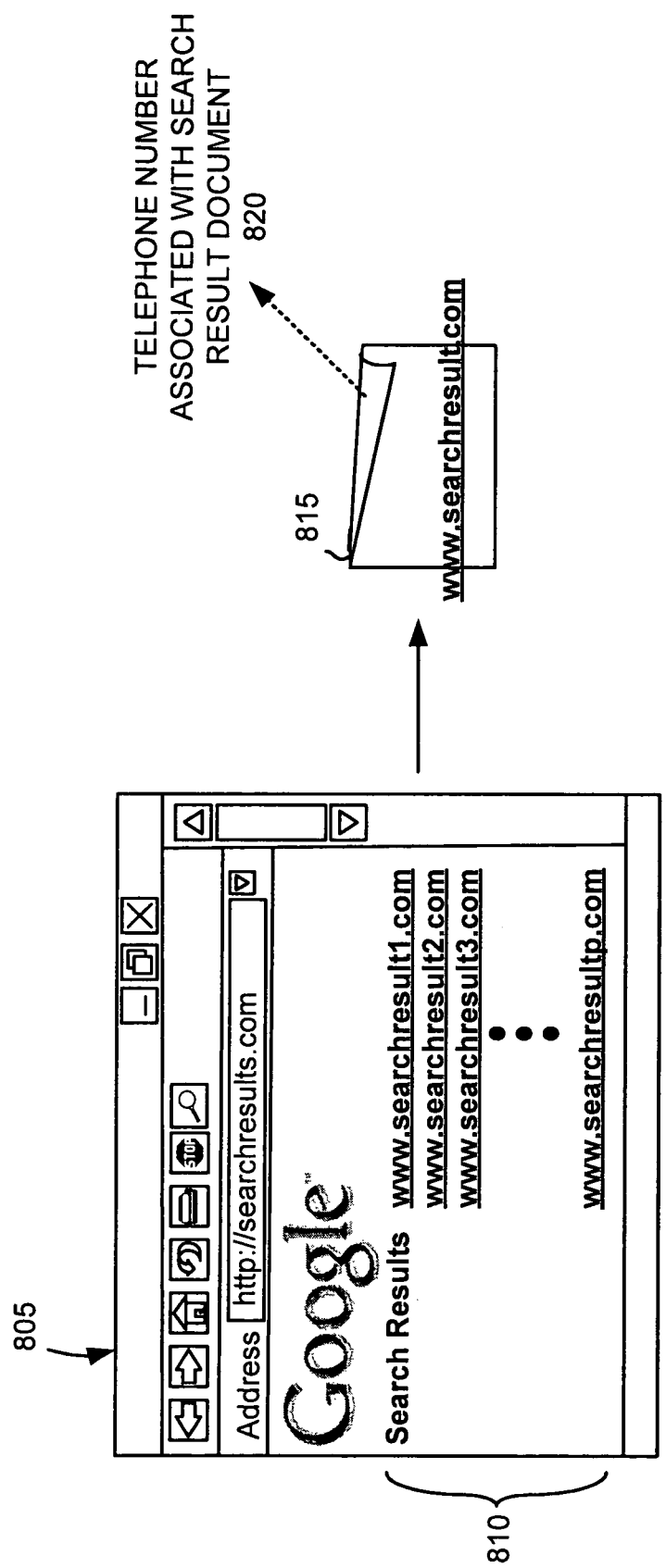
FIG. 8 is an exemplary diagram of determining a telephone number that is associated with a selected search result document consistent with an aspect of the invention.

FIG. 8 illustrates provision of a document 805 containing a list 810 of links to search result documents. Each link in list 810 may contain a reference to a document 815 hosted at server(s) 230. As shown in FIG. 8, a telephone number 820 may be associated with a search result document 815. Returning to FIG. 6A, a selection of a document from the search results may be received at server 220 (block 615). A user may, for example, select a link from search result document 805 to access a desired document and an indication of the selected link may be sent to server 220.

A telephone number associated with the selected document may be determined (block 620). In one implementation, the telephone number may be parsed from the selected document using various techniques. In one technique, the telephone number may be parsed from text displayed on the document based on a textual pattern, such as, for example, the typical format of telephone numbers. For example, the visible text on the document may be analyzed to identify a telephone number having a typical telephone number pattern that may include different domestic telephone patterns (e.g., xxx-yyy-zzzz, (x) yyy-zzzz, xxx/yyy-zzzz, xxxyyyzzzz) or different foreign telephone number patterns. The visible text on the document may further be analyzed to identify a name of an entity that is associated with the parsed telephone number based on, for example, proximity, surrounding words, punctuation, etc. For example, text containing the name "Company A Customer Service" may be located in close proximity to text containing the telephone number 222-555-4444. The entity "Company A Customer Service" may, therefore, be associated with the telephone number 222-555-4444.

Figure 9:
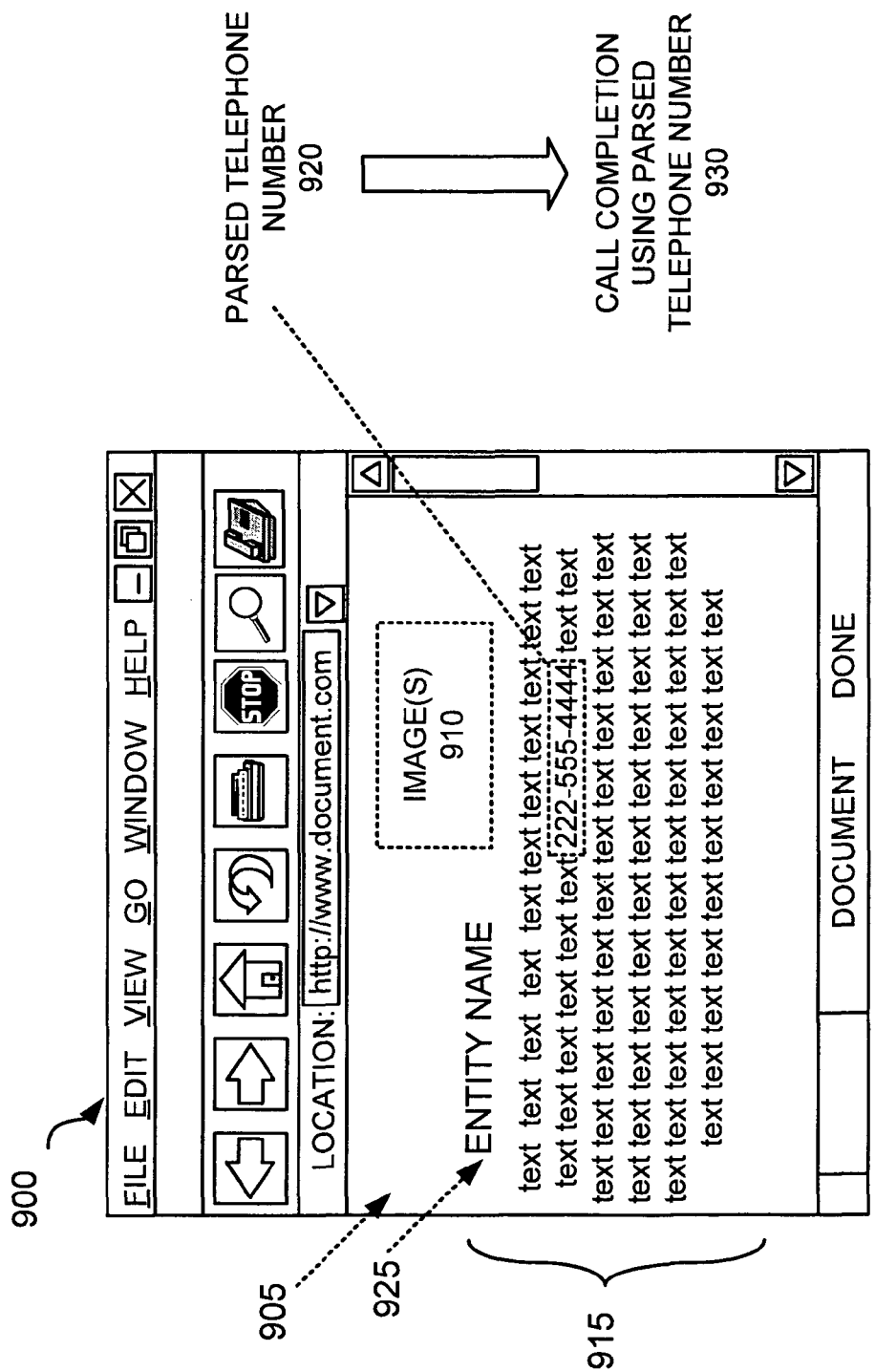
FIG. 9 is an exemplary diagram of parsing text in a document to identify a telephone number associated with the document consistent with an aspect of the invention.

FIG. 9 illustrates parsing of a telephone number from a document 905 consistent with this implementation. A document 905 selected from a list of search results, and retrieved by browser 900, may include one or more images 910 and a body of visible text 915 displayed on the document. The body of visible text 915 may be parsed, by search engine system 225, or browser 900 at a client 210, to identify a telephone number 920 and, possibly, an entity name 925 to be associated with the telephone number. In another implementation, visible text 915 may be parsed, by search engine system 225, to identify multiple telephone numbers. The user may select via, for example, a list displayed in a browser toolbar, a single telephone number from the multiple telephone numbers when establishing a voice call.

In another implementation, telephone number search services, such as, for example, online yellow pages, white pages and/or 800 number search services, or one or more telephone number databases, may used to determine a telephone number associated with a selected search result document. The telephone numbers may be stored and maintained by an external telephone number search service, or may be stored locally in association with server 220. A name of the entity associated with the selected search result document may first be extracted from the document using existing techniques. Such entity name extraction techniques may include using explicit rules or machine learning techniques that learn to combine evidence from a number of sources. An additional set of rules may be used to provide variations on entity names to facilitate searching of yellow and white pages databases (e.g., if the extracted name is "Yoshi's Restaurant and Jazz Club," include "Yoshi's," "Yoshi's Restaurant," "Yoshi's Jazz Club," etc.). In one implementation, the technique described in U.S. application Ser. No. 11/024,765, entitled "Local Item Extraction" and incorporated by reference herein in its entirety, may be used for identifying a name of an entity associated with a selected search result document.

Figure 10:
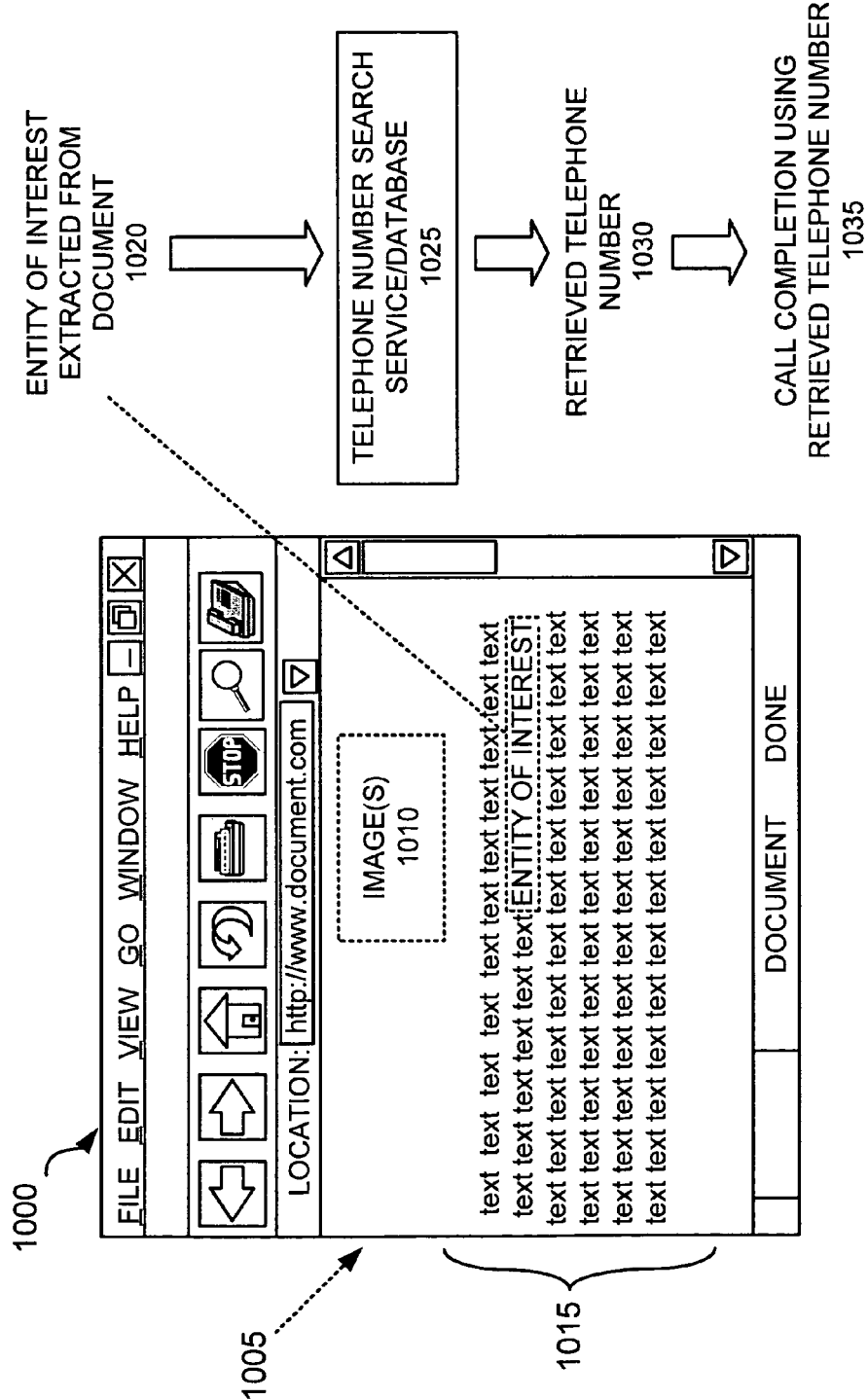
FIG. 10 is an exemplary diagram of extracting a name of an entity of interest from text in a document, and determining a telephone number associated with that entity using a telephone number search service or a telephone number database, consistent with an aspect of the invention.

FIG. 10 illustrates parsing of a name of an entity of interest from a selected search result document, and use of the entity name to determine an associated telephone number using a telephone number search service and/or telephone number database. A document 1005 selected from a list of search results, and retrieved by browser 1000, may include one or more images 1010 and a body of visible text 1015 displayed on the document. The body of visible text 1015 may be parsed, by search engine system 225, or browser 1000 at a client 210, to extract a name of an entity of interest 1020 that is contained in document 1005. The name of the entity of interest 1020 may be used, in conjunction with a telephone number search service or database 1025, to retrieve a telephone number 1030 associated with the entity of interest 1020.

In an additional implementation, a document developer, or advertiser, may explicitly provide a contact telephone number. In the case of an advertiser, for example, an "on-line" form completed by the advertiser to specify their advertising parameters may include an explicit field for a contact telephone number. In the case of a document developer, a tag, such as the tag encoded in the document, as described above with respect to FIG. 5, may used to identify a telephone number that is associated with a selected search result document. Search engine system 225 may retrieve the telephone number from the tag when a search result document is selected from a list of search results by a user. In a further implementation, the tag identification technique described above with respect to block 405 of FIG. 4 may be used to determined the telephone number associated with the selected document.

In certain instances, a telephone number may not be determined to be associated with the retrieved document. In such a case, other documents associated with the retrieved document may be used to determine a telephone number. For example, other documents hosted on the same site as the retrieved document may be used to determined a telephone number. As one illustrative example, if a document X containing product information and hosted on site A is retrieved, and is determined to not have a telephone number associated with it, then another document Y hosted on site A may be determined to have a telephone number associated with it. The telephone number associated with document Y may, thus, be determined to be associated with document X of site A.

Telephone numbers associated with other documents hosted on the same site as the retrieved document may be retrieved based on a set of rules that may, for example, analyze text surrounding a telephone number. For example, a text string such as "customer service," "questions, please call," "contact us," etc. in close proximity to a string having the format xxx-yyy-zzzz may be used to identify a telephone number(s) associated with the documents hosted on the same site.

In some instances, a telephone number may not be determined to be associated with the retrieved document, or with other documents hosted on the same site as the retrieved document. Some retrieved documents may not have an associated telephone number (i.e., no tag 515 contained in the document code, no telephone number parsed from document text, no telephone number found using number search services or a database, or no telephone number associated with other documents hosted on the same site as the retrieved document) and, therefore, no voice service may be available with respect to the retrieved document (block 625—NO) (FIG. 6B). If voice service is available with respect to the retrieved document (i.e., a telephone number is determined to be associated with the retrieved document) (block 625—YES), then a call between the user and the determined telephone number may be facilitated (block 630). For example, as shown in FIGS. 9 and 10, a call may be completed 930 or 1035, using the telephone number determined in block 620.

In one implementation, as already described with respect to FIG. 5, a call may be facilitated after retrieval of the document when the user "selects" a button 520 upon a toolbar of browser 500. Thus, in one implementation, to establish a call with a telephone associated with the document 505 retrieved via browser 500, the user may select call button 520 on a toolbar of browser 500 and tag 515 of document 505 may be located and the telephone number may be extracted from tag 515 for call establishment. In another implementation, multiple tags may be contained in document 505, and the user may select a telephone number, from a list of telephone numbers corresponding to each of the multiple tags displayed in a browser toolbar, to establish a call. In other implementations, after determination of a telephone number using techniques such as those described with respect to FIGS. 9 and 10, the user may select call button 520 on a toolbar of browser 500 to establish a call with the telephone associated with the determined telephone number. In further implementations, multiple phone numbers may be associated with a retrieved document, or with other documents hosted on the same site as the retrieved document. In such a case, the user may be presented with a list of possible telephone numbers as well as surrounding text from the document where each of the telephone numbers was located. The user may select from the presented list based on, for example, the surrounding text.

In the event that no telephone number is determined to be associated with the retrieved document, then call button 520 of browser 500 may be "deactivated" (e.g., a color change indicating that the button is inactive) such that button 520 cannot be selected by a user.

Exemplary Implementations

Figure 11:
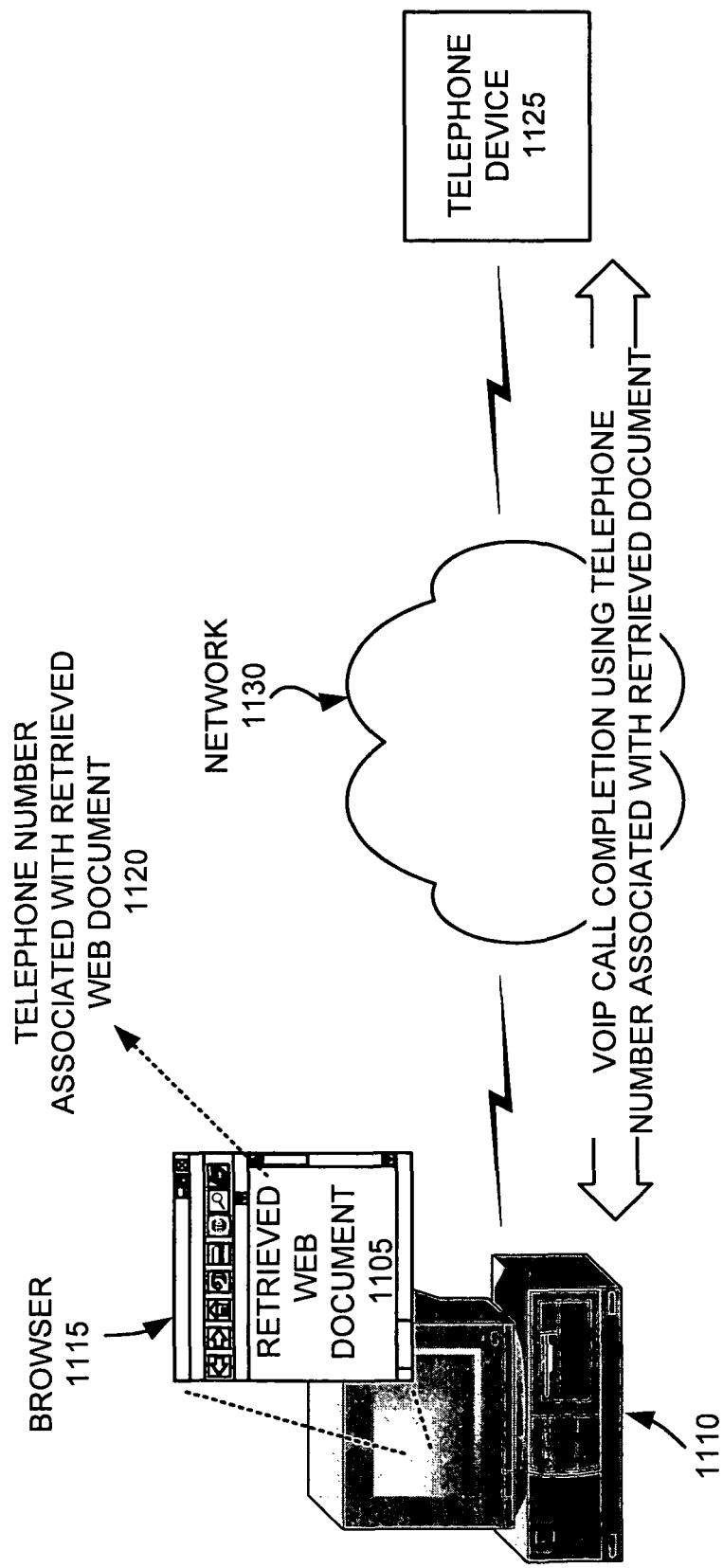
FIG. 11 is a diagram of call completion according to an exemplary implementation of the invention.

FIG. 11 is a diagram that illustrates an exemplary implementation of the invention in which a telephone number associated with a web document retrieved at a desktop computer is determined and used to establish a VOIP call between the desktop computer and a telephone device (e.g., a PDA, another desktop computer, etc.) associated with the determined telephone number. As shown in FIG. 11, a web document 1105 may be retrieved by a user at a desktop computer 1110 via a web browser 1115. A telephone number 1120 associated with the retrieved web document 1105 may be determined using one of the techniques described above with respect to FIG. 4 or 6A and 6B. A VOIP call may then be completed between desktop computer 1110 and the telephone device 1125 that is associated with telephone number 1120 via a network 1130. For example, computer 1110 may initiate a telephone application that receives the telephone number and places the VOIP call.

Figure 12:
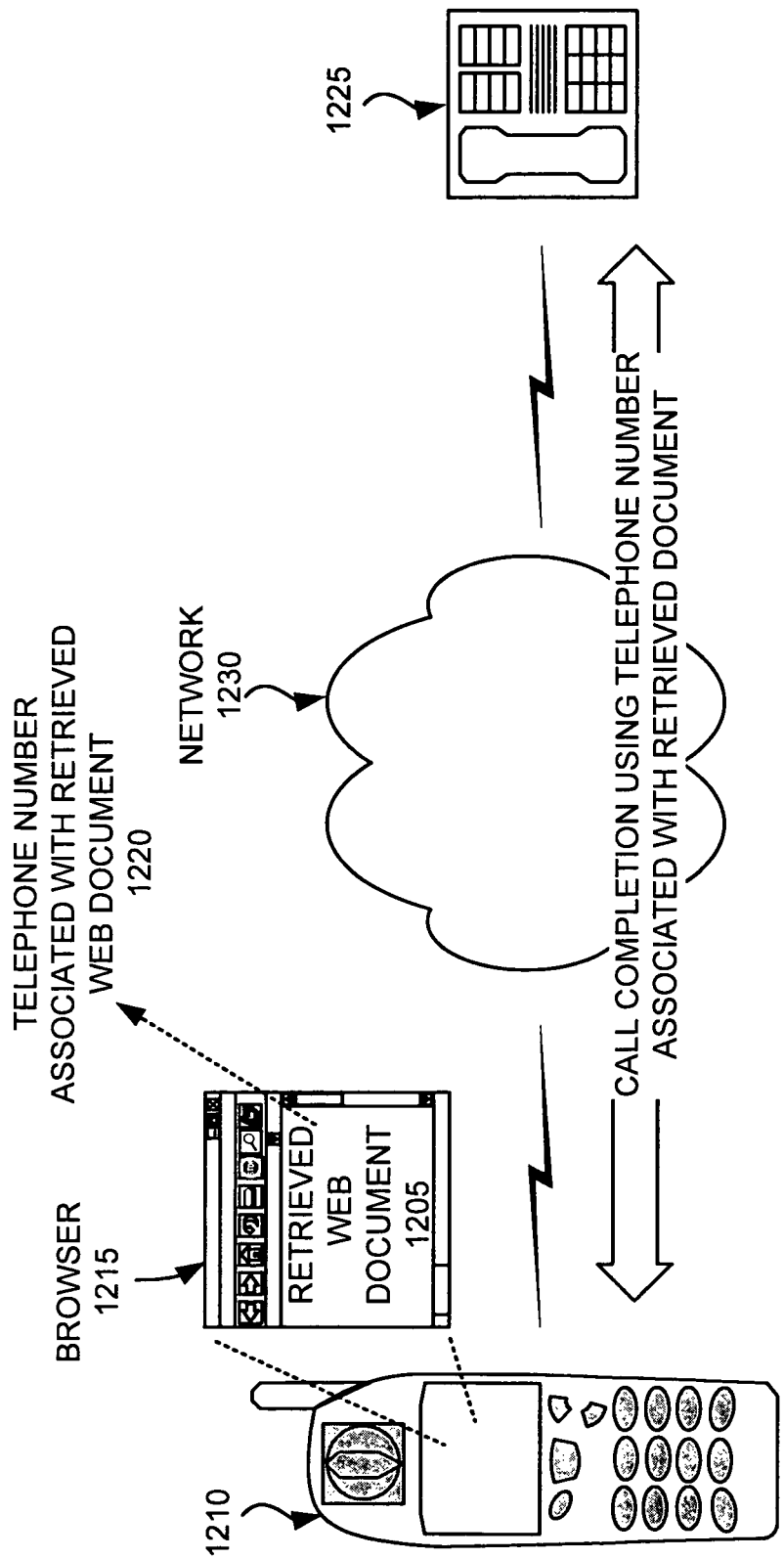
FIG. 12 is a diagram of call completion according to another exemplary implementation of the invention.

FIG. 12 is a diagram that illustrates another exemplary implementation of the invention in which a telephone number associated with a web document retrieved at a mobile telephone is determined and used to establish a call between the mobile telephone and a telephone associated with the determined telephone number. As shown in FIG. 12, a web document 1205 may be retrieved by a user at a mobile telephone 1210 via a web browser 1215. A telephone number 1220 associated with the retrieved web document 1205 may be determined using one of the techniques described above with respect to FIG. 4 or 6A and 6B. A call may then be completed between mobile telephone 1210 and a telephone 1225 that is associated with telephone number 1220 via a network 1230.

Figure 13:
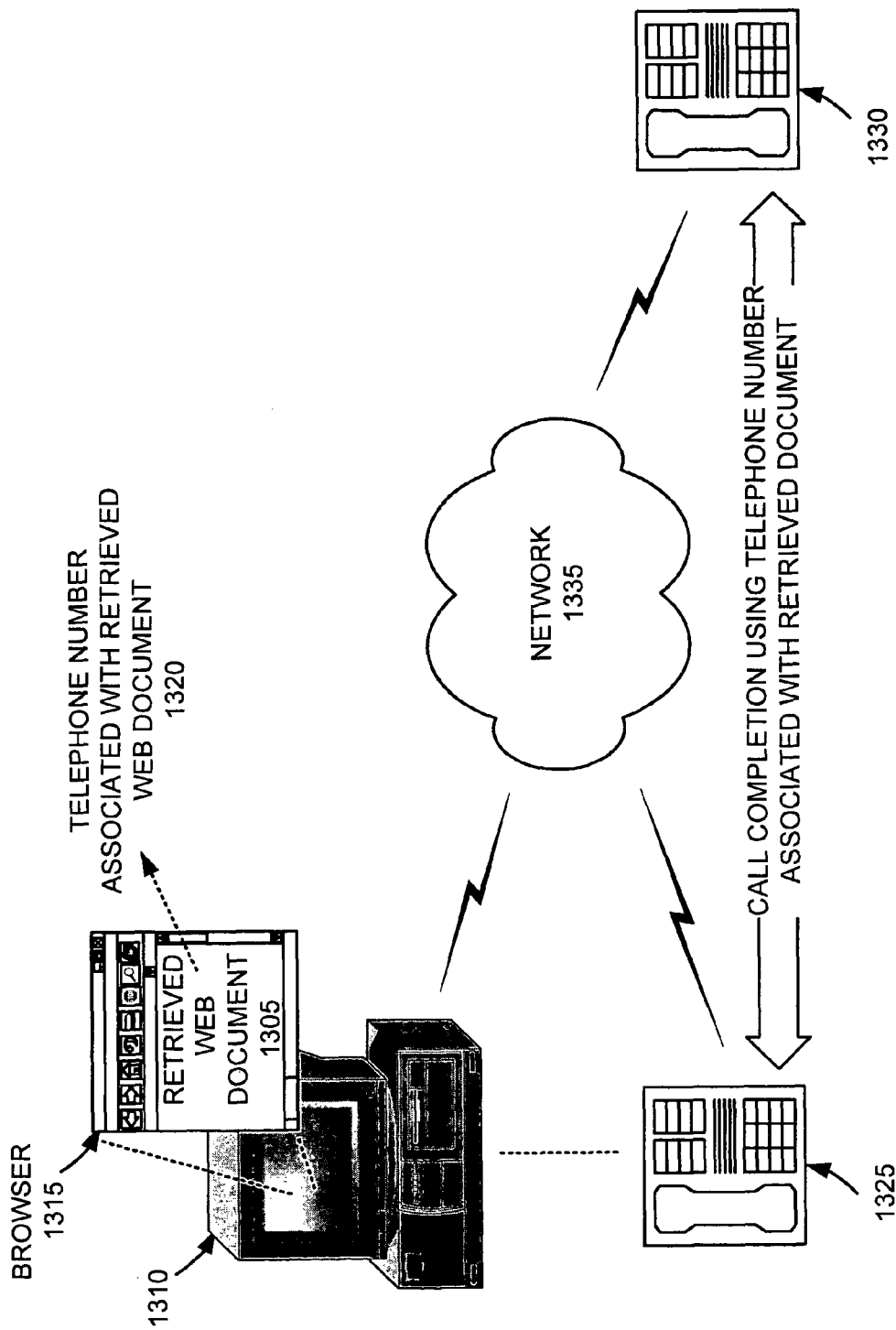
FIG. 13 is a diagram of call completion according to a further exemplary implementation of the invention.

FIG. 13 is a diagram that illustrates a further exemplary implementation of the invention in which a telephone number associated with a web document retrieved at a desktop computer is determined and used to establish a call between a telephone co-located with the desktop computer and a telephone associated with the determined telephone number. As shown in FIG. 13, a web document 1305 may be retrieved by a user at a desktop computer 1310 via a web browser 1315. A telephone number 1320 associated with the retrieved web document 1305 may then be determined using one of the techniques described above with respect to FIGS. 4 or 6A and 6B. A call may then be completed between a telephone 1325, that is co-located with computer 1310, and a telephone 1330 that is associated with telephone number 1320 via a network 1335. Desktop computer 1310 may provide the telephone number associated with telephone 1325 to a switch (e.g., a central office) in network 1335, and the switch may establish a connection between telephone 1325 and telephone 1330 using the provided telephone number and telephone number 1320.

CONCLUSION

Systems and methods consistent with the principles of the invention enable existing document searching techniques to be extended to searching the telephone network. By facilitating voice calls based on retrieved documents, users who, for example, "surf" the web may be able to easily complete transactions over the telephone, talk to live people to obtain information not available on a given site, or interact with existing automated voice or touch-tone systems. By extending document searching techniques to apply to searching the telephone network, a more powerful search capability may be obtained than is currently provided by yellow pages or directory assistance.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4, 6A and 6B, the order of the acts may be modified in other implementations consistent with the principles of the invention. Further, non-dependent acts may be performed in parallel. The telephone number identification techniques described above with respect to FIGS. 9 and 10 may further be used in the exemplary process described above with respect to FIG. 4.

Though some aspects of the invention have been described with respect to documents containing primarily text and/or images, the principles of the invention may also apply to documents that contain segments of audio data or segments or video data. In the case of documents containing segments of video data, optical character recognition (OCR) may be used to identify telephone numbers associated with the video content. For example, a video segment may include infomercials, commercials, news shows, etc. where a telephone number is displayed (e.g., "call the number on your screen for more information"). OCR may be used to extract the telephone number from the video segment. In the case of segments of audio data (e.g., a recording of an advertisement, a news broadcast, etc.), speech recognition techniques may be used to extract spoken telephone numbers from the segment of audio data. The telephone numbers extracted from video or audio data may then be used for call completion as described herein.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
    receiving, by one or more processors of the one or more server devices, a request for a document;
    retrieving, by one or more processors of the one or more server devices, code corresponding to the document, where a first portion of the code produces visible text in the document and a second portion of the code does not produce visible text in the document;
    extracting, by one or more processors of the one or more server devices, a tag from the second portion of the code, where the tag identifies a telephone number associated with the document;
    receiving, by one or more processors of the one or more server devices, an instruction to place a telephone call; and
    facilitating, by one or more processors of the one or more server devices, initiation of the telephone call using the telephone number in response to the received instruction.

2. The method of claim 1, where facilitating initiation of the telephone call comprises:
    providing the telephone number to a device for placement of the telephone call.

3. The method of claim 2, where the tag comprises code whose purpose is to identify the telephone number associated with the document.

4. The method of claim 1, where the document is identified using a web browser.

5. The method of claim 4, further comprising:
    extracting the tag in response to user selection of a button on a toolbar of the web browser.

6. The method of claim 1, where the call comprises a Voice over Internet Protocol (VOIP) call.

7. The method of claim 1, where the document is one of a plurality of documents in a list of search results.

8. The method of claim 1, where facilitating initiation of the telephone call comprises:
    initiating a telephone application;
    providing the telephone application with the telephone number; and
    placing, using the telephone application, the telephone call based on the telephone number.

9. A computer-readable memory device containing programming instructions that when executed by a processor cause the processor to perform a method comprising:
    retrieving a document;
    parsing text contained in the document to identify a name of an entity included in the text;
    automatically determining a telephone number associated with the name of the entity, where the telephone number is not included in the document;
    receiving an instruction to initiate a voice call to the telephone number, and
    initiating a call to the telephone number in response to the received instruction.

10. The computer-readable memory device of claim 9, where determining the telephone number comprises:
    sending the name of the entity to a device associated with a telephone number search service, and
    receiving, from the device associated with the telephone number search service, the telephone number associated with the name of the entity.

11. The computer-readable memory device of claim 10, where the telephone number search service comprises at least one of an on-line yellow pages search service, an on-line white pages search service, or an 800 number search service.

12. The computer-readable memory device of claim 9, where determining the telephone number comprises:
    sending the name of the entity to a device associated with a telephone number database, and
    receiving, from the device associated with the telephone number database, the telephone number associated with the name of the entity.

13. A method performed by one or more server devices, the method comprising:
    analyzing, by one or more processors of the one or more server devices, a first document hosted by a device to ascertain whether a telephone number is associated with the first document;
    analyzing, by one or more processors of the one or more server devices, other documents hosted by the device to identify one or more telephone numbers associated with the other documents when the first document does not have a telephone number associated with the first document; and selectively associating, by one or more processors of the one or more server devices, the one or more telephone numbers with the first document.

14. The method of claim 13, further comprising:

presenting the one or more telephone numbers to a user accessing the first document;

receiving a selection of one of the one or more telephone numbers from the user; and facilitating a voice call to the selected one of the one or more telephone numbers.

15. The method of claim 13, further comprising:

analyzing text surrounding each of the one or more telephone numbers; and selecting one of the one or more telephone numbers to associate with the first document based on the text analysis.

16. The method of claim 13, further comprising:

presenting the one or more telephone numbers to a user accessing the first document;

presenting text surrounding the one or more telephone numbers from the other documents to the user;

receiving a selection of one of the one or more telephone numbers from the user; and facilitating a voice call to the selected one of the one or more telephone numbers.

* * * * *